Jan. 2, 1951 E. L. CLARK 2,536,838
HIGH-EFFICIENCY CATHODE-RAY BEAM DEFLECTION SYSTEM
Filed May 24, 1949
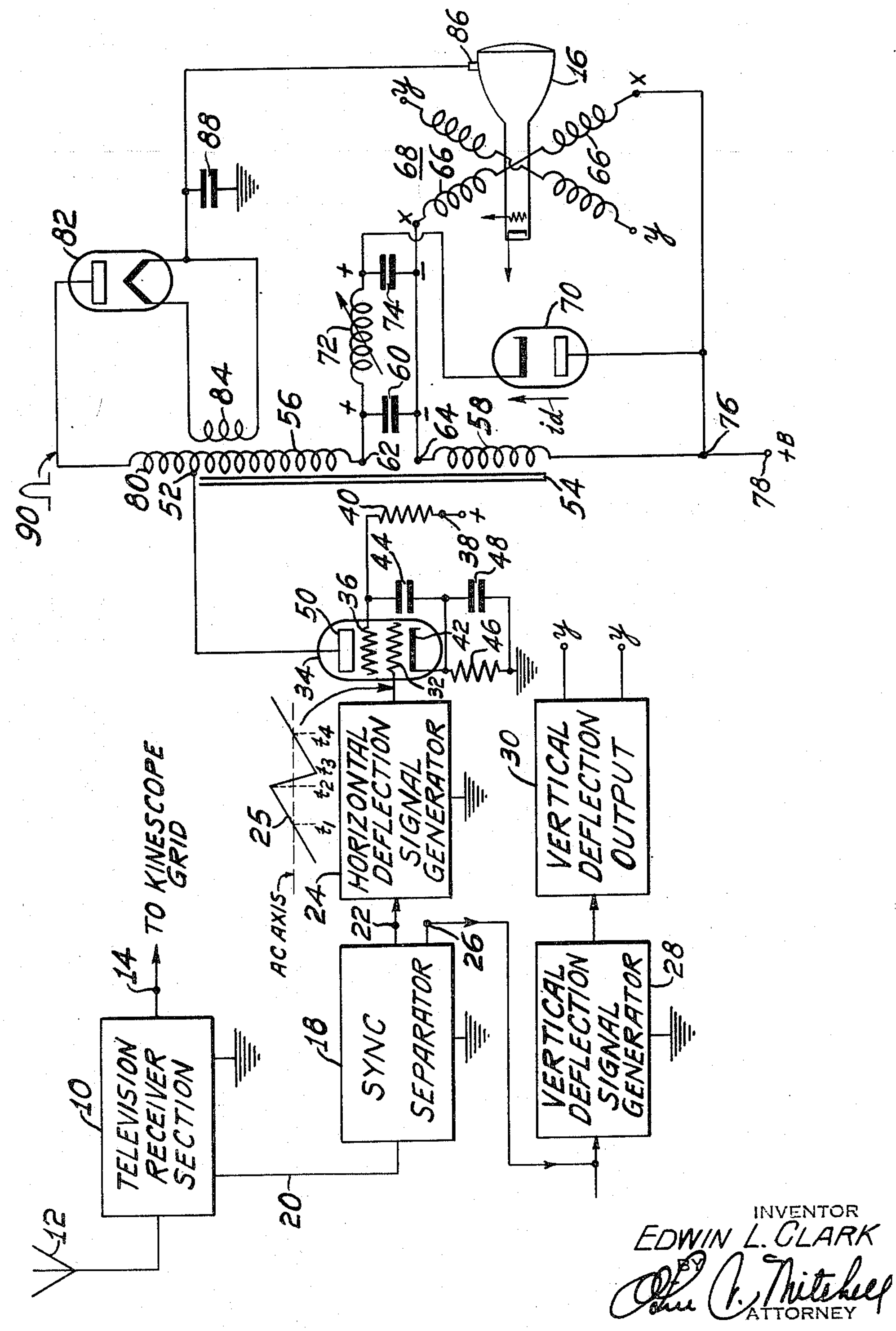
INVENTOR
EDWIN L. CLARK
BY
ATTORNEY Patented Jan. 2, 1951 2,536,838

UNITED STATES PATENT OFFICE 2,536,838

HIGH-EFFICIENCY CATHODE-RAY BEAM DEFLECTION SYSTEM

Edwin L. Clark, Collingswood, N. J., assignor to Radio Corporation of America, a corporation of Delaware Application May 24, 1949, Serial No. 95,106

15 Claims. (Cl. 315—19)

The present invention relates to deflection systems for cathode ray tubes and more particularly to high efficiency reaction scanning power recovery circuits for use with television image scanning and reproducing type cathode ray tubes.

The present invention deals more directly with a versatile and economical type of deflection system suitable for use in television receiver circuits wherein it is desirable to efficiently extract and transform energy from the deflection circuit into high unidirectional potentials suitable for use as cathode ray beam accelerating potentials.

Parallel with the recent rapid growth of the television art and the increased demand by the public for television receiving circuits giving high-quality performance at minimum cost there has been an attempt by those engaged in the design of television circuits to effect circuit economies wherever possible without however sacrificing circuit performance.

As will be appreciated by those skilled in the television art, one of the most extravagant components of television equipment is that of the cathode ray tube beam deflection system which is usually of the electromagnetic variety. Generally speaking, the electromagnetic deflection circuit is not only inefficient in itself but requires relatively large amounts of "B" power. Particularly in television receiving circuits is this latter characteristic disadvantageous since it establishes the need for a "B" power supply system of relatively high capacity and of necessarily high cost. It is for this reason that considerable effort has been extended to improve wherever possible the operating efficiency and reduce the cost of cathode ray beam deflection systems. Accordingly, numerous reaction scanning type systems have been proposed which incorporate facilities for recovering energy cyclically stored in the electromagnetic system and feeding back energy so recovered into the deflection system in the form of increased "B" potential. Such a general system is shown and described in a U. S. patent to Torsch No. 2,451,641, issued October 19, 1948, entitled "Power Conservation System," as well as in an article appearing in vol. 8 of the RCA Review of September 1947, entitled "Magnetic Deflection Circuits" by Otto H. Schade. These systems greatly reduce the power demand on the "B" power supply system and form the basis for considerable saving in the cost of television receiver manufacture.

To effect even further economies in the overall circuits required for the operation of cathode ray tubes such as, for example, in television receivers, steps have been taken to develop the high unidirectional potential usually demanded for cathode ray beam acceleration from pulse energy extracted from the beam deflection circuits.

Although all of these higher efficiency cost reducing measures are satisfactory to a degree, there still remains well-defined room for improvement in deflection circuits themselves as well as the combination type deflection circuit which provides beam accelerating potential in addition to beam deflection. For instance, there are in current commercial use power recovery systems of the "B" boost variety having incorporated therewith a high voltage pulse step-up type, an output transformer which in order to provide sufficiently high pulse step-up action, as well as deflection amplitude and linearity, has an inherently high leakage reactance which necessarily imparts higher overall losses to the deflection system. To overcome these disadvantages as well as the higher cost of such a rather complex transformer, considerable attention has been given to the practicability and development of direct-drive types of deflection circuits in which the magnetic deflection yoke is directly included in the anode-cathode circuit of the deflection output discharge tube. With such an arrangement, it has then been found possible to derive high voltage pulses from the deflection circuit for rectification and use as beam accelerating potential, by employing a pulse step-up transformer in series with the direct-drive deflection yoke. Such an arrangement is shown in a co-pending U. S. patent application by Simeon I. Tourshou and William E. Scull, Jr., Serial No. 56,562, filed October 26, 1948, entitled "High Voltage Power Supply." An even later adaptation of this type of direct-drive circuit as shown in a U. S. patent application by Allen A. Barco, Serial No. 62,844, filed December 1, 1948, entitled "Power Recovery Damping System" provides a novel form of "B" boost action which as heretofore described recovers a portion of the magnetic energy cyclically stored in the magnetic system and effectively increases the "B" power supply potential to the deflection output tube.

The present invention aims to provide a high efficiency low cost reaction scanning system of the "B" boost type which overcomes some of the disadvantages hereinabove set forth in relation to the prior art systems.

It is moreover a purpose of the present invention to provide an improved form of reaction scanning power recovery deflection system for cathode ray beam deflection systems which eliminates the need of a complex coupling transformer and yet provides means for deriving high unidirectional potential beam accelerating energy directly from energy stored in the magnetic system at the expense of little additional input "B" power.

It is still another purpose of the present invention to provide an improved form of deflection circuits for television systems wherein a portion of the cyclically damped reactive energy in the yoke circuit is applied for boosting the polarizing potential of the driving vacuum tube.

A still further object of the present invention resides in the provision of a novel improved and economical form of power recovery reaction scanning deflection system for use in television systems wherein there is provided a versatile control over the characteristics of the developed waveform.

In order to accomplish the above objects, the present invention, in one of its more general forms, contemplates the use of an autotransformer having at least a portion of its winding connected in series with the anode-cathode circuit of a deflection output discharge tube. An electromagnetic deflection yoke is then connected in shunt with another portion of the autotransformer winding for coupling with the anode-cathode circuit of the output discharge tube. A still third portion of the autotransformer winding not embraced by either the yoke or the output discharge tube anode-cathode circuit, is then employed as a source of high voltage pulses which are subsequently rectified to develop a high unidirectional potential for cathode ray beam acceleration. The beam accelerating energy thereby developed directly represents energy extracted from the deflection circuit itself at the expense of very little additional input power. In one of its more specific forms, not necessarily employing the beam accelerating potential source feature, the autotransformer employed by the present invention is provided with two winding sections galvanically separable from one another and mutually connected by novel "B" boost power recovery and wave-shaping network which is made to respond to energy recovered from the deflection yoke by a damping device connected therewith.

Numerous other objects and features of the present invention, some of which together with the foregoing, will be set forth in the following description of specific apparatus embodying and utilizing the invention's novel arrangement.

It is therefore to be understood that the present invention is not limited in any way, other apparatus shown in the specific embodiments as other advantageous application within the scope of the present invention as set forth in the appended claims will occur to those skilled in the art after having benefited from the teachings of the following description especially when considered in connection with the accompanying drawing in which the figure schematically illustrates one form of the present invention as applied to a television receiver type cathode ray beam deflection system.

Turning now to the figure, there is represented by the block 10, a section of a type television receiver which may include an RF amplifier, an oscillator, converter, IF amplifier, video demodulator, video amplifier and sync clipper. Details of these circuits, as well as other television circuits hereinafter represented in block form, will be well-known to those skilled in the television art, examples of which are shown in an article by Antony Wright entitled "Television Receivers" appearing in the March 1947 issue of the RCA Review.

The input of the television receiver 10 is accordingly provided with signals intercepted by an antenna 12 which are amplified by the receiver and demodulated to appear at the output 14 indicated for connection to the modulating grid or electrode of the cathode ray image reproducing tube 16. The video signals demodulated within the receiver are suitably clipped to provide horizontal and vertical sync pulses for input to the sync separator circuit 18 by a connection 20. The horizontal synchronizing pulses then appearing at the output terminal 22 of the sync separator are applied for synchronization of the horizontal deflection signal generator 24 while the vertical synchronizing pulses appearing at the sync separator output terminal 26 are applied for synchronization of the vertical deflection signal generator 28. The output of the vertical deflection generator 28 is conventionally connected for driving on the vertical deflection output stage 30 while the output of the horizontal deflection signal generator 24 is applied for driving of the grid 32 of the horizontal deflection output discharge tube 34. Suitable biasing potential for the discharge tube screen 36 is supplied from a source of positive potential 38 through screen dropping resistor 40 which is in turn by-passed to the cathode 42 by by-pass capacitor 44. A self-biasing cathode resistor 46, whose value is chosen in accordance with a desired predetermined operating bias, is conventionally connected in the cathode circuit of the discharge tube 34 which resistor is by-passed by capacitor 48.

According to the present invention, the anode 50 of the deflection output discharge tube 34 is connected with one terminal 52 of an autotransformer 54. The autotransformer 54 is provided with separate winding sections 56 and 58 which, in further accord with the present invention, are connected by capacitor 60 at their most central terminals 62 and 64. The horizontal deflection winding 66 of the cathode ray deflection yoke 68 is then connected substantially in shunt with the second winding section 58 of the autotransformer 54. The yoke damping device comprising, for example, the discharge tube 70 is then connected in damping relation with the yoke 66 through the "B" boost capacitor 74. As shown, a wave-shaping network comprising the series combination of the variable inductance 72 and capacitor 60 is connected in shunt with the capacitor 74 such that damping current from the discharge tube 70 must pass through the inductance 72. In order to provide biasing polarizing potential for the anode 50 of the discharge tube 34, the lower terminal 76 of the transformer second winding section is connected with a source of B+ 78.

A relatively high impedance continuation 80 of the autotransformer winding is then connected across the rectifier diode 82. The heater of the rectifier 82 is provided with energy from a separate winding 84 magnetically coupled to the autotransformer and which is not only connected with the accelerating anode 86 of the cathode ray tube 16 but is connected with ground by the storage capacitor 88.

In accordance with well-known principles of reaction scanning as described, for example, in the above-referenced article "Magnetic Deflection Circuits" by Otto H. Schade, the bias on the output discharge tube 34 is so adjusted that during operation, the driving sawtooth 25, provided by the horizontal deflection signal generator 24, will produce anode-cathode conduction only during a period corresponding to a little more than half of the deflection cycle. Considering now the specific novel operation of the invention's embodiment in the figure, it shall be assumed that the output tube 34 is thereby rendered conductive by the sawtooth 25 only during the time $t_1$–$t_2$ during which interval anode-cathode current will pass from the positive source of supply 78 through the diode 70 through the inductance 72 and through the first winding section 56 of the autotransformer to the anode 50 of the output discharge tube. This, of course, will induce some deflection voltage and current in the second winding section 58 of the autotransformer which will cause a substantially linear rise of deflection current to flow through the yoke 66. At the end of time $t_2$, corresponding to the beginning of the "flyback" interval of the deflection cycle, the discharge tube 34 becomes non-conductive, the magnetic fields in the autotransformer and yoke will then collapse causing ringing of the magnetic circuit at its self-resonant frequency, normally designed to be at least 4 to 5 times that of the deflection frequency. After one-half cycle of free oscillation, the voltage appearing across the deflection yoke 66 will be of such polarity to cause the diode 70 to conduct and thereby damp the energy magnetically stored in the yoke at this time. The direction of the damping current through the diode will be in the direction of the arrow *id* which will tend to charge the capacitors 74 and 60 such that their discharge tube anode extremities are positive with respect to the "B" power supply potential 78. This discharge current *id* in accordance with well-known reaction scanning principles will, of course, provide a first portion of the current sawtooth through the yoke 66 which portion will correspond to the time $t_3$–$t_4$ of the driving sawtooth 25. By the time $t_4$, the horizontal discharge tube 34 will have been rendered conductive and this time due to the bias across capacitors 60 and 74, the diode 70 will not immediately conduct, which will thereby allow most of the horizontal output discharge tube anode-cathode current to flow through the autotransformer second winding section 58 through capacitors 60 and 74 and the first winding section 56. As the proper turns ratio has been established between the autotransformer first and second winding sections, equilibrium will be established between the current thereby discharged from the capacitors 60 and 74 by discharge tube anode-cathode circuit and the energy the capacitors received from damping the current of the diode 70. This, of course, corresponds to the turns ratio value making the average damper current *id* equal to the average horizontal output discharge tube anode-cathode current. It will be apparent from the circuit operation that the voltage appearing at the output discharge tube extremity of the capacitor 60 will be positively in excess of the B+ voltage appearing at terminal 78 and therefore a boosted "B" potential will be applied to the anode 50 of the output discharge tube. In the light of the previous description, this effective boost in "B" voltage is attributable to energy recovered from the magnetic circuit through the agency of the damping diode 70.

According to the present invention, in order to afford means for adjusting the waveform of the resulting deflection current through the yoke 66, the variable inductance 72 is imposed in series with the output discharge tube anode-cathode circuit and the damping discharge tube anode-cathode circuit as shown. The capacitor 60 is placed in shunt with this variable inductance 72 through its connection with the capacitor 74. The parabolic waveform then developed across the inductance 72 may be so adjusted in phase as to correct the waveform of the otherwise substantially perfect sawtooth through the yoke 66 so that the deflection distortion due to the screen flatness of most cathode ray tubes is virtually overcome.

Moreover, according to the present invention, the "flyback" pulse 90 appearing at the upper extremity of the transformer winding 80 and resulting from the sharp transient in the magnetic system corresponding to the "flyback" time $t_2$–$t_3$ of the deflection cycle is rectified by the diode 82 to develop a high unidirectional potential across the storage capacitor 88 by proper proportioning of the autotransformer winding, the voltage developed across the capacitor 88 for application to the beam accelerating electrode 86 of the cathode ray tube 16 may be in excess of 8,000 volts for "B" power supply potentials of a few hundred volts.

It will be noted that, whereas as hereinabove described, some prior art systems derive the high-voltage pulse 90 from a separate pulse step-up transformer included in series with the anode-cathode circuit of the deflection output tube and magnetically isolated from energy imparted to the deflection yoke, the present invention obtains a substantially higher operating efficiency by magnetically associating the high-voltage pulse step-up winding with a magnetic circuit coupled to the yoke. Moreover, the expense of a conventional horizontal output transformer having separate primary and secondary windings magnetically coupled with one another has been obviated with an increase in efficiency due to the elimination of the leakage reactance inherently involved in such conventional primary and secondary coupling. However, even with the elimination of the prior art coupling transformer, which was generally considered as necessary for the obtaining of a suitable "B" boost power recovery action, the present invention provides such a "B" boost action in connection with an autotransformer and moreover provides novel means for adjusting the waveform of the resulting deflection current.

Having thus described my invention, what I claim is:

1. In a cathode ray beam deflection system, the combination of, a deflection output amplifier having an anode and a cathode, an autotransformer connected in series with the anode-cathode circuit of said output amplifier, a high voltage pulse step-up winding magnetically integral with said autotransformer, means for rectifying pulse energy developed across said step-up winding to derive therefrom a unidirectional potential, means for connecting an electromagnetic cathode ray beam deflection yoke in shunt with a lower impedance portion of said autotransformer winding than that portion embraced by said output amplifier, and damping means for said deflection yoke connected in shunt with a portion of said autotransformer and said deflection yoke.

2. Apparatus according to claim 1 wherein said yoke damping means is connected in shunt with the same portion of said autotransformer as said deflection yoke but wherein a storage capacitor is imposed in series with the connection of said damping means to said yoke.

3. Apparatus according to claim 2 wherein said storage capacitor is in turn shunted by a variable low-pass filter network whereby the voltage waveform appearing across said storage capacitor and inserted in series with said damping device is made variable.

4. In a cathode ray beam deflection system, the combination of, a deflection output amplifier having an anode and a cathode, an autotransformer connected in series with the anode-cathode circuit of said output amplifier, a high voltage pulse step-upwinding magnetically integral with said autotransformer, means for rectifying pulse energy developed across said step-up winding to derive therefrom a unidirectional potential, means for connecting an electromagnetic cathode ray beam deflection yoke in shunt with a portion of said autotransformer winding than that portion embraced by said output amplifier, damping means for said deflection yoke connected in shunt with a portion of said autotransformer and said deflection yoke and wherein said yoke damping means is connected in shunt with the same portion of said autotransformer as said deflection yoke but wherein a storage capacitor is imposed in series with the connection of said damping means to said yoke.

5. In a cathode ray beam deflection circuit employing an output discharge tube having an anode and a cathode, the combination of, an autotransformer having a high impedance tap, a medium impedance tap, a low impedance tap and a datum tap to which said other taps are referenced, connections placing that portion of said autotransformer residing between said medium impedance tap and said datum tap in series with the anode-cathode circuit of said output discharge tube, voltage rectifying means connected with said high impedance tap for developing a unidirectional potential for magnetic energy cyclically stored in said autotransformer, connections for placing an electromagnetic beam deflection yoke in shunt with a portion of said autotransformer residing between said low impedance tap and said datum tap, and deflection yoke damping means connected in shunt with said deflection yoke connections.

6. Apparatus according to claim 5 wherein there is connected in series with said damping means a storage capacitor across which there will thereby be developed a terminal voltage representative of energy damped by said damping means.

7. Apparatus according to claim 6 where there is placed in shunt with said storage capacitor a a low-pass filter network whereby to alter the waveform of the voltage appearing across said storage capacitor.

8. Apparatus according to claim 6 wherein there is provided connections utilizing the developed unidirectional potential for beam acceleration of a cathode ray tube and wherein the connections for said electromagnetic deflection yoke are adapted to embrace a deflection winding magnetically associated with said cathode ray tube.

9. In an electromagnetic deflection system for a cathode ray tube, said system being of the type employing a deflection output discharge tube having an anode and a cathode with a load circuit connected therebetween, said load circuit including a source of polarizing potential, the combination of, an autotransformer having a first and second winding sections galvanically separable from one another but mutually magnetically coupled, said first winding section having at least a first, second and third taps thereon and said second winding section having at least a first and second taps thereon, a storage capacitor connected between the third tap of said first winding section and the first tap of said second winding section thereby defining a primary connection to said autotransformer as being between said first winding section second tap and said second winding section second tap, a low impedance secondary connection as being between said second winding section first and second taps and a high impedance secondary as being between said first winding section first tap and said second winding section second tap, connections placing said autotransformer primary directly in series with the output circuit of said discharge tube, connections for placing an electromagnetic cathode ray deflection yoke across said autotransformer low impedance secondary, connections for placing voltage rectifying means across said autotransformer high impedance secondary, and damping means connected between said autotransformer first winding section third terminal and said second winding section second terminal.

10. Apparatus according to claim 9 where there is placed in series with said damping device and said first winding section third terminal a variable inductance with a wave-shaping capacitor connected in shunt therewith through said storage capacitor.

11. Apparatus according to claim 9 wherein said damping device comprises a discharge tube having an anode and a cathode, the connections of said damping device being such that said damping discharge tube cathode is connected to said autotransformer first winding section third tap while said damping discharge tube anode is connected with said autotransformer second winding section second tap.

12. Apparatus according to claim 9 wherein the connection of said autotransformer primary in the load circuit of said deflection output discharge tube is such that said deflection output discharge tube anode is connected with the autotransformer first winding second tap while said deflection output discharge tube cathode is connected through said source of polarizing potential to said autotransformer second winding section second tap.

13. In an electromagnetic beam deflection circuit for a cathode ray tube having associated therewith an electromagnetic beam deflection yoke suitable for coupling with the anode-cathode circuit of a deflection output discharge tube, the combination of, an autotransformer having a first and second winding sections galvanically separable from one another, said first winding section having a first and second tap and said second winding section having a first and second tap, a storage capacitor connected between said first winding section second tap and said second winding section first tap thereby to define the autotransformer primary input as being between the first winding section first terminal and the second winding section second terminal while establishing the winding between the second winding section first and second terminals as the autotransformer secondary, connections placing said autotransformer primary input connections directly in series with the anode-cathode circuit of the deflection output discharge tube, connections placing said electromagnetic deflection yoke in shunt with the secondary of said autotransformer, and a damping device for said deflection yoke connected between said first winding section second tap and said second winding section second tap.

14. Apparatus according to claim 13 wherein there is placed in series with the connection of said damping device to said first winding section second tap a variable inductance and wherein there is additionally provided another capacitor connected between the damping device extremity of said inductance and the first terminal of said autotransformer second winding section.

15. Apparatus according to claim 14 wherein said damping device comprises an electron discharge tube having an anode and a cathode and wherein its connections to said autotransformer are such that said damping device cathode is connected with said first winding section second tap while said damping device anode is connected with said second winding section second tap.

EDWIN L. CLARK.

REFERENCES CITED

The following references are of record in the file of this patent:

UNITED STATES PATENTS

| Number | Name | Date |
| --- | --- | --- |
| 2,280,733 | Tolson | Apr. 21, 1942 |
| 2,360,697 | Lyman | Oct. 17, 1944 |
| 2,440,418 | Tourshou | Apr. 27, 1948 |
| 2,458,532 | Schlesinger | Jan. 11, 1949 |